United States Patent
Bai et al.

(10) Patent No.: US 12,030,032 B2
(45) Date of Patent: Jul. 9, 2024

(54) HIGH PERFORMANCE $CO_2/H_2O$ DISPLACEMENT DESORPTION SORBENTS AND METHODS OF MAKING SAME

(71) Applicants: ExxonMobil Technology and Engineering Company, Annandale, NJ (US); TDA Research, Inc., Wheat Ridge, CO (US)

(72) Inventors: Chuansheng Bai, Phillipsburg, NJ (US); Majosefina Cunningham, Whitehall, PA (US); Patrick P. McCall, Matawan, NJ (US); Hans Thomann, Bedminster, NJ (US); Jeannine Elizabeth Elliott, Superior, CO (US); Vinh Nguyen, Arvada, CO (US)

(73) Assignees: ExxonMobil Technology and Engineering Company, Annandale, NJ (US); TDA Research, Inc., Wheat Ridge, CO (US)

( * ) Notice: Subject to any disclaimer, the term of this patent is extended or adjusted under 35 U.S.C. 154(b) by 489 days.

(21) Appl. No.: 17/316,713

(22) Filed: May 11, 2021

(65) Prior Publication Data

US 2021/0268474 A1 Sep. 2, 2021

Related U.S. Application Data

(62) Division of application No. 15/910,130, filed on Mar. 2, 2018, now abandoned.
(Continued)

(51) Int. Cl.
*B01J 20/08* (2006.01)
*B01D 53/02* (2006.01)
(Continued)

(52) U.S. Cl.
CPC ............. *B01J 20/08* (2013.01); *B01D 53/02* (2013.01); *B01J 20/041* (2013.01);
(Continued)

(58) Field of Classification Search
CPC ...... B01J 20/08; B01J 20/041; B01J 20/3007; B01J 20/3078; B01J 20/3204; B01J 20/3236; B01D 53/02
See application file for complete search history.

(56) References Cited

U.S. PATENT DOCUMENTS 5,935,894 A ‡ 8/1999 Kanazirev ............... B01J 23/02
502/341
9,446,343 B2 ‡ 9/2016 Elliott ................... B01D 53/06
(Continued)

FOREIGN PATENT DOCUMENTS

CN 102234125 A ‡ 11/2011
CN 102234125 A 11/2011
(Continued)

OTHER PUBLICATIONS

International Search Report and Written Opinion issued in related International Application No. PCT/US18/20606 dated Apr. 30, 2018.‡

*Primary Examiner* — James A Fiorito
(74) *Attorney, Agent, or Firm* — Troutman Pepper Hamilton Sanders LLP; John Morrissett; Scott A. Bergeson

(57) ABSTRACT

The disclosure generally relates to CCS sorbents, particularly for $CO_2/H_2O$ displacement desorption process. The sorbents include an aluminum oxide support that includes alkali metal salts within the support, in the form of pseudo alkali aluminate. The sorbents also include alkali metal salt impregnated on the support. The sorbents demonstrate improved $CO_2$ loadings and better $H_2O/CO_2$ ratios, as well
(Continued)

as improved stability. Compositions and methods of making are disclosed.

12 Claims, 2 Drawing Sheets

Related U.S. Application Data

(60) Provisional application No. 62/466,744, filed on Mar. 3, 2017.

(51) Int. Cl.
  *B01J 20/04* (2006.01)
  *B01J 20/30* (2006.01)
  *B01J 20/32* (2006.01)

(52) U.S. Cl.
  CPC ....... *B01J 20/3007* (2013.01); *B01J 20/3078* (2013.01); *B01J 20/3204* (2013.01); *B01J 20/3236* (2013.01); *B01D 2253/1124* (2013.01); *B01D 2257/504* (2013.01); *B01D 2258/0283* (2013.01); *Y02C 20/40* (2020.08)

(56) References Cited

U.S. PATENT DOCUMENTS

| | | | |
|---|---|---|---|
| 9,504,955 B2 ‡ | 11/2016 | Elliott | B01D 53/06 |
| 9,527,029 B2 ‡ | 12/2016 | Elliott | B01D 53/06 |
| 9,539,540 B2 ‡ | 1/2017 | Elliott | B01D 53/06 |
| 2015/0007727 A1* | 1/2015 | Elliott | B01D 53/04 95/139 |
| 2015/0008366 A1‡ | 1/2015 | Elliott | B01J 20/3204 252/184 |

FOREIGN PATENT DOCUMENTS

| | | | | |
|---|---|---|---|---|
| WO | 2016015923 A1 | 2/2016 | | |
| WO | WO-2016015923 A1 ‡ | 2/2016 | ............ | B01J 20/041 |

\* cited by examiner
‡ imported from a related application

HIGH PERFORMANCE CO$_2$/H$_2$O DISPLACEMENT DESORPTION SORBENTS AND METHODS OF MAKING SAME

CROSS REFERENCE TO RELATED APPLICATIONS

This application is a Divisional of U.S. patent application Ser. No. 15/910,130, filed 2 Mar. 2018, entitled, "High Performance CO2/H2O Displacement Desorption Sobents and Methods of Making Same," which claims the benefit, under 35 U.S.C. § 119(e), of U.S. Provisional Patent Application No. 62/466,744, filed 3 Mar. 2017, entitled, "High Performance CO2/H2O Displacement Desorption Sobents and Methods of Making Same," which is entirely incorporated herein by reference

STATEMENT REGARDING FEDERALLY SPONSORED RESEARCH

Portions of this disclosure were made with government support under Contract No. DE-FE0012870, awarded by the Department of Energy. The government may have certain rights in the invention.

TECHNICAL FIELD

The various embodiments of the disclosure relate generally to methods and compositions of high performance sorbents, particularly alkali metal salt aluminum oxide sorbents. The sorbents are particularly useful for CO$_2$/H$_2$O displacement desorption, and have been developed with improved stability and performance.

BACKGROUND

Fossil fuels currently supply the majority of world's energy needs and their combustion is the largest source of anthropogenic carbon dioxide emissions. Carbon dioxide is a greenhouse gas and is believed to contribute to global climate change. Concern over global climate warming has led to interest in capturing CO$_2$ emissions from the combustion of fossil fuels. The quantities of combustion gas produced in electric power generation are large because of the scale of furnaces and turbines utilized. One measure of the scale of these operations is the amount of CO$_2$ produced in a typical 500 Megawatt power plant, for coal fired power generation, the rate of CO$_2$ production is on the order of 100 kg per second; for gas fired power production it is more like 50 kg per second.

CO$_2$ can be removed from combustion flue gas streams by various methods, often referred to a carbon capture and sequestration (CCS.) The challenge for CO$_2$ capture from flue gas is to do it efficiently to minimize the cost. All post-combustion CO$_2$ capture technologies suffer from the disadvantages that the CO$_2$ in the flue gas is present at low pressure (1 atmospheric pressure) and in low concentrations (3 to 15%). A large amount of energy is needed to separate CO$_2$. Developing methods that minimize the amount of energy and other costs will be necessary if CO$_2$ removal from flue gas is to be economical. Methods for the removal of CO$_2$ from flue gas streams include adsorption with a solvent, adsorption with a sorbent, membrane separation, and cryogenic fractionation and combinations thereof. In absorption/adsorption processes to capture CO$_2$, the energy needed to regenerate the sorbent or solvent is also a large cost element.

CO$_2$ displacement desorption process uses a competitive adsorption of H$_2$O to drive off adsorbed CO$_2$ on sorbent. During CO$_2$ capturing step, CO$_2$ of the flue gas displaces the adsorbed H$_2$O on the sorbent. Displacement desorption swings the concentrations of H$_2$O and CO$_2$. It is an isothermal process and has no need for pressure swing.

BRIEF SUMMARY

The various embodiments of the disclosure relate generally to CCS sorbents, particularly CO$_2$/H$_2$O displacement desorption sorbents, and methods for preparing the same.

An embodiment of the disclosure can be a method for preparing a CCS sorbent, comprising preparing a support by mixing a mixture comprising an aluminum compound and an aqueous solution of a first alkali metal salt to form a dough, extruding the dough to form an extrudate, and drying the extrudate to form the support, impregnating a second alkali metal salt into the support; and drying the impregnated support to create the sorbent. In some embodiments, the extrudate can be further calcined after drying.

In some embodiments, the extrudate can be dried at 125-500° C. The extrudate can also be dried at 250-350° C.

In some embodiments, the aluminum compound can be aluminum oxide, aluminum oxide hydroxide, aluminum hydroxide, boehmite, or pseudoboehmite. In some embodiments, the aluminum compound can be aluminum oxide hydroxide, boehmite, or pseudoboehmite.

In some embodiments, the first alkali metal salt can be a potassium salt, a sodium salt, or both a potassium salt and a sodium salt. In some embodiments, the second alkali metal salt can be lithium, sodium or potassium; or the second alkali metal salt can be sodium or potassium; or the second alkali metal salt can be sodium and potassium.

In some embodiments, the support can be a pseudo alkali aluminate. In some embodiments, the support can be a pseudo potassium aluminate, or a pseudo sodium aluminate, or a pseudo mixed potassium-sodium aluminate.

An embodiment of the disclosure can be a method for preparing a CCS sorbent, comprising impregnating a second alkali metal salt solution into a support; wherein the support is prepared by mixing an aluminum compound and an aqueous solution of a first alkali metal salt to form a dough, extruding the dough to form an extrudate, and drying the extrudate to form the support. In some embodiments, the extrudate is further calcined after drying.

In some embodiments, the extrudate can be dried at 125-500° C. The extrudate can also be dried at 250-350° C.

In some embodiments, the aluminum compound can be aluminum oxide, aluminum oxide hydroxide, aluminum hydroxide, boehmite, or pseudoboehmite. In some embodiments, the aluminum compound can be aluminum oxide hydroxide, boehmite, or pseudoboehmite.

In some embodiments, the first alkali metal salt can be a potassium salt, a sodium salt, or both a potassium salt and a sodium salt. In some embodiments, the second alkali metal salt can be lithium, sodium or potassium; or the second alkali metal salt can be sodium or potassium; or the second alkali metal salt can be sodium and potassium.

In some embodiments, the support can be a pseudo alkali aluminate. In some embodiments, the support can be a pseudo potassium aluminate, or a pseudo sodium aluminate, or a pseudo mixed potassium-sodium aluminate.

An embodiment of the disclosure can include a CCS sorbent, particularly a CO$_2$/H$_2$O displacement desorption sorbent. The sorbent can comprise a support, having an aluminum compound and a pseudo alkali aluminate, and an impregnated alkali salt.

In some embodiments, the pseudo alkali aluminate can include potassium, sodium or both potassium and sodium. In some embodiments, the pseudo alkali aluminate comprises potassium and sodium.

In some embodiments, the impregnated alkali salt can be lithium, sodium or potassium; or the impregnated alkali metal salt can be sodium or potassium; or the impregnated alkali metal salt can be sodium and potassium.

In some embodiments, the alkali composition of the support can be at least about 3 wt % as $M_2O$, at least about 5 wt %, or at least about 8 wt %. The impregnated alkali salt can be at least about 5 wt % as $M_2O$ of the total sorbent, or at least 7 wt %, or at least 9 wt %.

DETAILED DESCRIPTION

Figure 1:
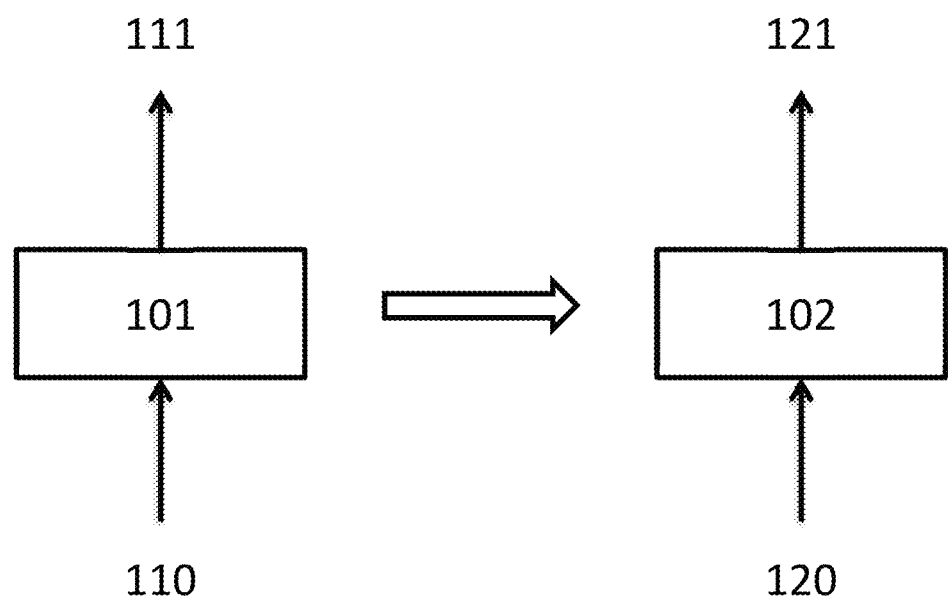
FIG. 1 illustrates a simplified system of $CO_2/H_2O$ displacement desorption system in which a sorbent of the disclosure would be applied, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Embodiments of this disclosure include sorbent for use in a CCS process, particularly $CO_2/H_2O$ displacement desorption, and methods for preparing or improving the stability of those sorbents. FIG. 1 demonstrates a simplified system of $CO_2/H_2O$ displacement desorption, in which a sorbent of this disclosure might be applied. System 100 includes two sorbent bed positions, 101 and 102, in which the sorbents of this disclosure would be placed. Sorbent bed position 101 contains a sorbent that is initially $CO_2$ poor. A $CO_2$ rich stream, 110, e.g. a flue gas feed from a combustion source, passes across sorbent bed 101, which absorbs the $CO_2$, and a $CO_2$ depleted stream exits the bed. Once sorbent bed 101 is saturated, it can move to sorbent bed position 102. A steam feed 120 containing water vapor, can enter the $CO_2$ saturated sorbent bed 102 and cause desorption and displacement of the $CO_2$ from the sorbent. The exit gas stream is then a $CO_2$ rich stream that can then be further processed. Once sorbent bed 102 is regenerated, it can return to position 101. Several applications of this system have been demonstrated, such as in U.S. Pat. Nos. 9,504,955; 9,446,343; 9,539,540; and 9,527,029.

The typical sorbent used in $CO_2/H_2O$ displacement desorption is an alkali metal salt impregnated on an aluminum oxide catalyst, particularly using a potassium salt. $K_2CO_3/Al_2O_3$ is a preferred sorbent currently. However, this sorbent deactivates on stream, which degrades performance of the system. CCS tests showed the sorbents usually had high initial $CO_2$ sorption capacities, but they were gradually losing $CO_2$ sorption capacities on stream. Sorbent aging also leads to higher $H_2O/CO_2$ molar ratios. Potassium carbonate agglomeration on the support surface gives rise to hydroxyl groups resurfacing, which results in more $H_2O$ sorption onto the sorbents.

Characterizations of spent sorbent revealed the formation of poison phase potassium aluminate carbonate. Under hydrothermal testing condition, $Al_2O_3$ slowly converts to aluminum hydroxide ($\gamma$-AlOOH, boehmite), which reacts easily with $K_2CO_3$ to form $KAlO_2$. The formation of $KAlO_2$ weakens its affinity towards $CO_2$ sorption. One route discovered and discussed herein to mitigate sorbent deactivation can include creating a denser phase support structure based on a pseudo $MAlO_2$ structure. The $\gamma$-$Al_2O_3$ support has a defect spinel structure, with ⅞ of tetrahedral sites and ½ octahedral sites that are empty, and these sites can accommodate alkali cations to form pseudo aluminates. Extrusions of $Na_2CO_3$ and $K_2CO_3$ with boehmite could form pseudo $NaAlO_2$ and $KAlO_2$ phases, acting as denser phases to limit further diffusions of $Na_2CO_3$ and $K_2CO_3$ into support, which leads to a stable and high performance CCS sorbent. Thus, to improve sorbent CCS performance, extrusions of sodium carbonate and potassium carbonate with aluminum hydroxide ($\gamma$-AlOOH, boehmite) were carried out to form supports with denser phases of pseudo $NaAlO_2$ and $KAlO_2$. The dense phase supports limit the further diffusions of $Na_2CO_3$ and $K_2CO_3$ into supports. These dense phase pseudo aluminate supports can then be impregnated with alkali metal salts, producing sorbents with excellent and stable CCS performances, high $CO_2$ loading capacities and low $CO_2/H_2O$ molar ratios.

The disclosure can include a method for preparing a CCS sorbent, including a $CO_2/H_2O$ displacement desorption sorbents. The method can include the steps of preparing a support, impregnating a second alkali metal salt into the support; and drying the impregnated support to create the sorbent. The support can be prepared by mixing a mixture that includes an aluminum compound and an aqueous solution of a first alkali metal salt to form a dough, extruding the dough to form an extrudate, and drying the extrudate to form the support. The CCS sorbent can also be prepared by impregnating a second alkali metal salt solution into a support; where the support is prepared by mixing an aluminum compound and an aqueous solution of a first alkali metal salt to form a dough, extruding the dough to form an extrudate, and drying the extrudate to form the support. In some embodiments, the extrudate is preferably further calcined after drying and before impregnation by the second alkali metal salt.

The disclosure can also include a CCS sorbent, including a $CO_2/H_2O$ displacement desorption sorbent. The CCS sorbent can include a support comprising an aluminum compound and a pseudo alkali aluminate, and an alkali salt impregnated on the support.

The first alkali metal salt and the aluminum compound can be mixed together by any mixing technique known to one of skill in the art. For example, the first alkali metal salt and the aluminum compound can be mulled or grinding together into a mixture containing the two compounds. The mixture can be extruded by any technique known to one of skill in the art, particularly as relates to solid supports used in sorbent technologies. Typically, the mixture is mulled as an aqueous solution of the first alkali metal salt and the aluminum compound. However, other polar protic and aprotic solvents could be applied, including particularly an alcohol.

The extrudate can be dried at any temperature that drives off moisture. The extrudate can be dried at greater than about 125° C., greater than about 150° C., greater than about 200° C., or greater than about 250° C. The extrudate can be dried at up to about 500° C., up to about 450° C., up to about 400° C., or up to about 350° C. The extrudate can be dried at a temperature between about 125° C. to about 500° C., about 200° C. to about 400° C., or about 250° C. to about 350° C. As discussed in a co-pending provisional application filed by the same entity on the same day, and titled CALCINATION OF $CO_2/H_2O$ DISPLACEMENT DESORPTION SORBENTS, which is incorporated by reference in its entirety as if set forth herein, the lower calcination temperatures can provide better support for the techniques disclosed herein.

Alternatively, the dried extrudate can be further calcined at a temperature of greater than about 400° C., greater than about 450° C., or greater than about 500° C. The extrudate can be calcined at a temperature of less than about 600° C.

In the disclosure, the aluminum compound includes any general aluminum oxide type compound, such as one or ordinary skill in the art would use in making aluminum oxide-type support structures. In an embodiment, the aluminum compound can be comprises aluminum oxide, aluminum oxide hydroxide, aluminum hydroxide, boehmite, or pseudoboehmite. The aluminum oxides, oxide hydroxides, and hydroxides can include aluminum oxides including γ-aluminum oxide, θ-aluminum oxide, corundum ($Al_2O_3$); aluminum oxide hydroxides such as diaspore (α-AlO(OH)), boehmite or böhmite (γ-AlO(OH)), akdalaite, including $5Al_2O_3 \cdot H_2O$ and $4Al_2O_3 \cdot H_2O$), also called tohdite; and aluminum hydroxides such as gibbsite, hydrargillite (hydrargyllite), bayerite, doyleite, nordstrandite, including α-Al(OH)$_3$, β-Al(OH)$_3$, γ-Al(OH)$_3$. In some preferred embodiments, the aluminum compound comprises aluminum oxide hydroxide compounds, particularly, boehmite, or pseudoboehmite. While traditional $Al_2O_3$ compounds, as well as other aluminum oxide type compounds can work effectively, and without wishing to be bound by theory, the boehmite and pseudoboehmite compounds appear to be more effective in part because of the added hydroxylation of the alumina composition, prior to drying and optionally calcining the support/extrudate.

The first alkali metal salt can include any alkali metal salt. By alkali metal is meant a Group 1 metal (group IA), including lithium (Li), sodium (Na), potassium (K), rubidium (Rb), and cesium (Cs). Preferably the first alkali metal salt can include sodium, potassium, or a combination of sodium and potassium. The first alkali metal salt can include potassium, or the first alkali metal salt can include sodium.

The second alkali metal salt can include any alkali metal salt. As used herein the second alkali metal salt can as be known as the impregnating, or impregnated, alkali salt, because this alkali metal salt is added second to the support via impregnation to for the sorbent. By alkali metal is meant a Group 1 metal (group IA), including lithium (Li), sodium (Na), potassium (K), rubidium (Rb), and cesium (Cs). The second alkali metal salt (i.e. impregnated alkali salt) can include lithium, sodium, potassium, rubidium, or cesium, or combinations thereof. The second alkali metal salt can include lithium, sodium, potassium, or cesium, or combinations thereof. The second alkali metal salt can include lithium, sodium, or potassium, or combinations thereof. The second alkali metal salt can include potassium and sodium.

In some instances, the second alkali metal salt can be two different alkali metal salts. For example, impregnating both potassium and sodium can provide improved performance and stability over impregnating with only one alkali metal salt, including particularly only potassium metal salts. As discussed in a co-pending provisional application filed by the same entity on the same day, and titled MIXED METAL SORBENTS FOR $CO_2/H_2O$ DISPLACEMENT DESORPTION, which is incorporated by reference in its entirety as if set forth herein, poisoning effects and improved performance can be achieved if two salts can be applied as the impregnating salts.

One of ordinary skill would understand that alkali metal in the context of this disclosure implies the alkali metal cation. As such, synonymous terms include alkali metal salt, alkali metal ion, alkali metal cation, an alkali salt, alkali ion, or alkali cation. The alkali metal salt can also in the context of this disclosure be referred to as an alkali metal composition.

Because the alkali metal is a cation, it will necessarily have a counterion, i.e. an anion. However, the nature of that anion is not a limiting issue. On the sorbent, particularly during operation, the anion can be a carbonate or bicarbonate counterion, or a hydroxyl or oxide anion that is part of the support to which the alkali metal is impregnated upon. Moreover, during preparation of the sorbents, and also as part of the sorbent when the salt is impregnated on the support, the alkali metal cation can have any counteranion one of ordinary skill would use. Nonlimiting examples of the anion can be hydroxides, halides, carbonates, bicarbonates, nitrates, nitrite, phosphate, hydrogen phosphate, dihydrogen phosphate, and organic acid salts including but not limited to acetate, citrate, gluconate, and benzoic acid, etc.

The support created by this method, and the support within the CCS sorbents, comprises a pseudo alkali aluminate. As discussed above and as shown in further detail below, alkali metals in the presence of hydroxylated aluminum compounds, particularly for example aluminum oxide hydroxide compounds, can combine under heat to form alkali aluminates, $MAlO_2$ where M is a alkali metal. Without wishing to be bound by theory, the structural form of this $MAlO_2$ is not necessarily pervasive throughout the entire support, and portions of the support can include regions of aluminum compounds such as $Al_2O_3$. However, the process disclosed here and the CCS sorbents created here include a denser phase section that includes the $MAlO_2$, i.e. alkali aluminate, and is referred to as a pseudo alkali aluminate because the structure is not purely or exclusively $MAlO_2$. Because of low temperature calcination and non-stoichiometry ratios between alkali metals and alumina support, the interactions between alkali metals and alumina can generate an amorphous phase, or pseudoaluminate, that lacks a long-range periodic ordering between alkali and alumina. High temperature calcination can generate a well-crystallized phase called alkali aluminate, which can be detected by X-ray diffraction. The pseudo alkali aluminate can be a pseudo potassium aluminate, a pseudo sodium aluminate, a pseudo lithium aluminate, a pseudo rubidium aluminate, or a pseudo cesium aluminate. The pseudo alkali aluminate can be a pseudo potassium aluminate, a pseudo sodium aluminate, or a pseudo lithium aluminate; or can be a pseudo potassium aluminate or a pseudo sodium aluminate, or a combination of a pseudo potassium aluminate and a pseudo sodium aluminate.

The methods and sorbent of the disclosure, by virtue of creating a pseudo alkali aluminate within the support prior to impregnation, can have two different alkali metal values. The first alkali metal value can indicate the amount of alkali metal within the support as part of the pseudo alkali aluminate. This value would also reflect the amount of alkali added to the mixture used for form the support, such as during mixing, extruding and before drying the extrudate. Thus, in an embodiment, the alkali composition of the support can be at least about 3 wt % of the support, at least about 4 wt % of the support, at least about 5 wt % of the support, at least about 6 wt % of the support, at least about 7 wt % of the support, at least about 8 wt % of the support, at least about 9 wt % of the support, or at least about 10 wt % of the support. The alkali composition of the support can be up to about 30 wt % of the support, or up to about 25 wt % of the support. In another embodiment, the amount of impregnated alkali salt, or the amount of alkali salt added to the support via impregnation during the method of making the support, can be at least about 5 wt % of the sorbent, at least about 6 wt % of the sorbent, at least about 7 wt % of the sorbent, at least about 8 wt % of the sorbent, at least about 9 wt % of the sorbent, at least about 10 wt % of the sorbent, at least about 11 wt % of the sorbent, or at least about 12 wt % of the sorbent. The percent weight of alkali metal is presented as weight $M_2O$ as a percentage of the total weight of the support or sorbent. The weight percent of $M_2O$ is defined as the weight of $M_2O$/(the weight of alumina support+the weight of $M_2O$). The weight percent of $M_2O$ usually ranges from 5 wt % to 30 wt %.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Example 1—Preparation of 8.6% $K_2O/Al_2O_3$ $\gamma$-$Al_2O_3$ extrudates (1/20 inch in diameter, quadlobe shape) were used as support to deposit $K_2CO_3$. It has surface area of 250 m²/g, 0.85 cm³/g pore volume and pore size centered on 73 Å. An aqueous solution containing potassium carbonate was prepared by dissolving $K_2CO_3$ in distilled $H_2O$. The sorbent of $K_2O/\gamma$-$Al_2O_3$ was prepared by an incipient wetness technique. As an example of sample preparation, 13.8 g of potassium carbonate was dissolved in 50.0 g of distilled water. The total solution volume of $K_2CO_3$ adjusted with distilled water was 78.9 ml. 100.0 g of $\gamma$-$Al_2O_3$ the extrudates were impregnated with the solution by incipient wetness. The sample was dried in air at 250° F. for 16 hours and calcined in air at 1000° F. for 3 hours. The furnace was ramped at rate of 5° F./min. During the calcination, the air flow was adjusted to 5 volume/volume solid/minute. The sorbent contains 8.6% $K_2O$ as K loading.

The metal loading is defined as metal oxides, which does not necessarily represent the final state of the metal precursors on alumina support. 11.03% $Na_2O/\gamma$-$Al_2O_3$ and 15.85% $K_2O/\gamma$-$Al_2O_3$ were also prepared. The carbonates, acetates and citrates of Na and K were used as precursor compounds for the sorbent preparations.

Example 2—Extrusions of 10% $K_2O$/V-300 $Al_2O_3$ 61.372 g of potassium carbonate was dissolved in 325 g of water. 500 g of Versal-300 alumina powders was impregnated with the solution of potassium carbonate ($K_2CO_3$). The mixture was placed in muller and mulled for 40 minutes. The extrusion dough targeted solid percentage was 49.41%. The mixture dough was extruded into 1/16" quadrilobe extrudates with Diamond America Extruder. After the extrusion, the extrudates were spread into thin layers in the sample trays. The extrudates were dried 16 hours in air at 250° F. After drying, the extrudates were used as supports for the impregnation of solution of sodium and potassium carbonates. A portion of extrudates were also calcined in air at 1000° F. for 3 hours. The furnace was ramped at rate of 5° F./min. During the calcination, the air flow was adjusted at 5 volume/volume solid/minute. The calcined extrudates were also used as supports for the deposition of sodium and potassium carbonates.

Besides the extrusion of 10% $K_2O$/V-300 $Al_2O_3$, the dense sorbent supports with different potassium loadings of 8% $K_2O$/V-300 $Al_2O_3$ and 12% $K_2O$/V-300 $Al_2O_3$ were also prepared and used as supports for deposition of sodium and potassium carbonates.

Besides the extrusions of potassium carbonate ($K_2CO_3$) with Versal-300 $Al_2O_3$ powders, the extrusions of sodium carbonate ($Na_2CO_3$) with Versal-300 $Al_2O_3$ powders were also carried out. The dense phase supports were used for deposition of sodium and potassium carbonates. The supports with various sodium contents were prepared with the following compositions: 6% $Na_2O$/V-300 $Al_2O_3$, 8% $Na_2O$/V-300 $Al_2O_3$, 10% $Na_2O$/V-300 $Al_2O_3$, 12% $Na_2O$/V-300 $Al_2O_3$, 16% $Na_2O$/V-300 $Al_2O_3$ and 20% $Na_2O$/V-300 $Al_2O_3$. The metal loading is defined as metal oxides, which does not necessarily represent the final state of the metal precursors on alumina support.

Besides the extrusions of potassium carbonate ($K_2CO_3$) with Versal-300 $Al_2O_3$ powders and the extrusions of sodium carbonate ($Na_2CO_3$) with Versal-300 $Al_2O_3$ powders, the extrusions of both potassium carbonate ($K_2CO_3$) and sodium carbonate ($Na_2CO_3$) with Versal-300 $Al_2O_3$ powders were also carried out. The dense phase supports were used for deposition of sodium and potassium carbonates. The supports prepared with the following compositions: 5.4% $K_2O$+3.5% $Na_2O$/V-300 $Al_2O_3$, 7.7% $K_2O$+ 5.1% $Na_2O$/V-300 $Al_2O_3$, and 9.9% $K_2O$+6.5% $Na_2O$/V-300 $Al_2O_3$.

Besides Versal-300 aluminum hydroxide (γ-AlOOH, boehmite) powders were used in extrusions to form dense phase supports, Versal-250 boehmite powders, Versal-700 boehmite powders and Catapal D boehmite powders were also used in extrusions. The dense phase supports were used for deposition of sodium and potassium carbonates.

Example 3—Preparation of 5.4% $K_2O$+3.5% $Na_2O$/10% $K_2O$/$Al_2O_3$

10% $K_2O$/$Al_2O_3$ extrudates both calcined and not-calcined were used as supports for the impregnation of solution of sodium and potassium carbonates.

The aqueous solution containing sodium and potassium carbonates was prepared by dissolving $Na_2CO_3$ and $K_2CO_3$ in distilled $H_2O$. The sorbent was prepared by incipient wetness. 17.276 g of potassium carbonate and 13.248 g of sodium carbonate were dissolved in 120 g of di-$H_2O$. 200 g of 10% $K_2O$/$Al_2O_3$ extrudates were impregnated with the solution by incipient wetness. The sample was dried in air at 250° F. for 16 hours and calcined in air at 1000° F. for 6 hours. The furnace was ramped at rate of 5° F./min. During the calcination, the air flow was adjusted at 5 volume/volume solid/minute.

In addition to 5.4% $K_2O$+3.5% $Na_2O$/10% $K_2O$/$Al_2O_3$, compositions containing 7.7% $K_2O$+5.1% $Na_2O$/10% $K_2O$/ $Al_2O_3$ and 9.9% $K_2O$+6.5% $Na_2O$/10% $K_2O$/$Al_2O_3$ were also prepared similarly.

Example 4—$CO_2$ Sorption/Steam Displacement Fixed Bed Testing

Simulated flue gas during fixed bed testing contained 13.4% $CO_2$ and 14.9% $H_2O$ balanced with $N_2$. The fixed bed volume is 100 cc. With the simulated natural gas conditions the flue gas space velocity during screening conditions was 10.56 SCCM/g for 9 minutes and steam regeneration space velocity was 3.74 SCCM/g for 9 minutes. The temperature during adsorption was about 140° C., increasing to approximately 153° C. during sorbent regeneration.

In the single fixed bed, all flow controllers were calibrated to obtain high accuracy in gas flowrates. Whenever a gas is not in use, the flow controller is completely shut to prevent any gas leakage. During adsorption cycle, $N_2$ and $CO_2$ are mixed with steam provided by 500 cc syringe pump. The feed enters the bed by down-flow through a 3-way valve and exits through another 3-way valve. The outlet gas/steam moves through a chiller, and the steam is condensed, collected and measured by an online scale. $N_2$ and $CO_2$ gases pass the chiller and exit to a ZRE $CO_2$ analyzer which measures the breakthrough $CO_2$ concentration. During regeneration cycle, both the 3-way valves are switched to allow steam controlled by 1000 cc syringe pump to enter the bed by up-flow and exit via a different path toward a second chiller. The steam is condensed and collected by online scale for measurement of water out in regeneration. $CO_2$ passes the chiller and is diluted with N2 before entering the ZRE $CO_2$ analyzer which detects the desorbed $CO_2$ concentration. Both syringe pumps are continuously running through a 3-way valve which directs the steam either through the bed or to a by-pass line. The downstream $N_2$ is also used to remove/flush out the condensed water in the exit line at the end of each cycle.

Figure 2A:
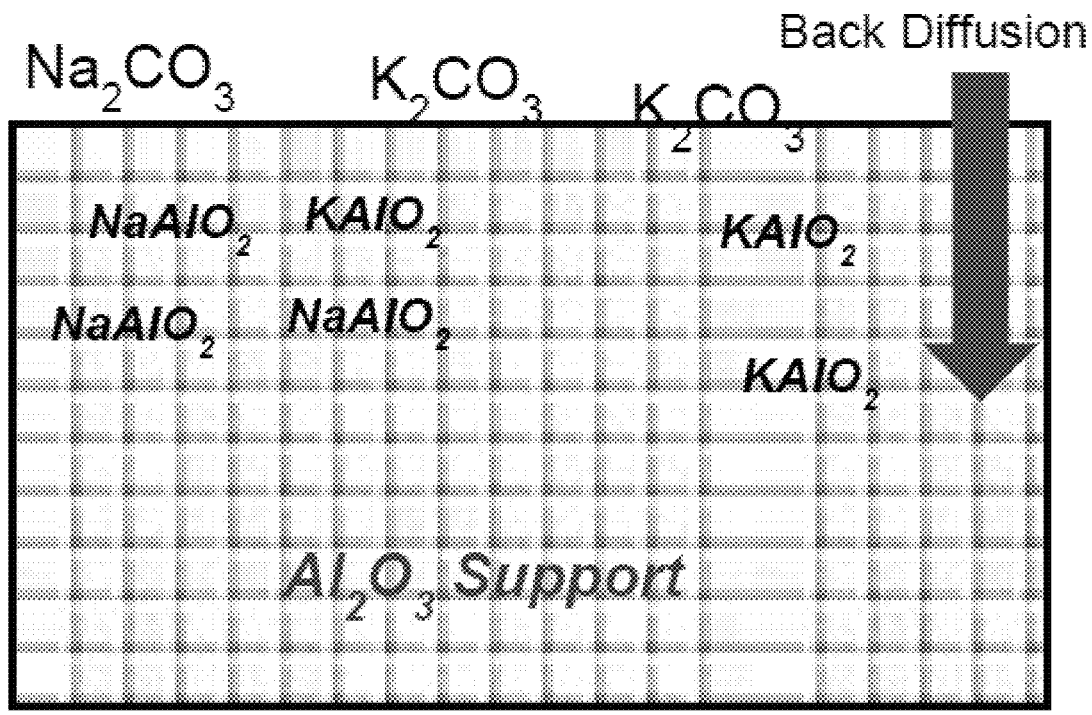
FIGS. 2A and 2B illustrate an $\gamma$-$Al_2O_3$ support with $Na_2CO_3$ and $K_2CO_3$, and the denser phase of $KAlO_2$ that stabilizes $K_2CO_3$ and $Na_2CO_3$, in accordance with an exemplary embodiment of the disclosure.
Figure 2B:
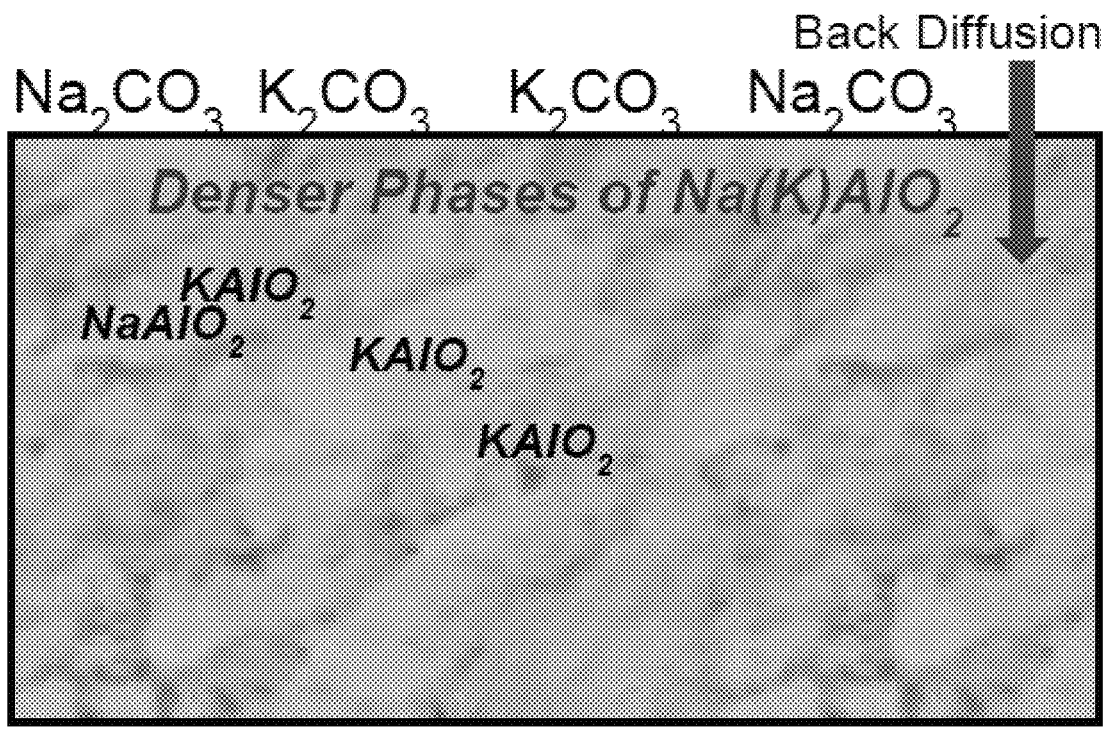

RESULTS AND DISCUSSION

γ-$Al_2O_3$ has a defect spinel structure. ⅞ of tetrahedral sites and ½ octahedral sites are empty, which can accommodate alkali cations to form aluminates. Extrusions of $Na_2CO_3$ and $K_2CO_3$ with boehmite were to perform sorbent supports of pseudo $NaAlO_2$ and $KAlO_2$, acting as denser phases to limit further diffusions of $Na_2CO_3$ and $K_2CO_3$ into support as illustrated in FIGS. 2A and 2B. The sorbents made by impregnations of $Na_2CO_3$ and $K_2CO_3$ on the dense phase supports of $NaAlO_2$ and $KAlO_2$ have led to the development of sorbents with excellent and stable CCS performances, high $CO_2$ loading capacity and low $CO_2$/$H_2O$ molar ratios.

Table 1 summarizes the $CO_2$/$H_2O$ displacement desorption performances of several $CO_2$ sorbents developed and incorporated herein.

TABLE 1

Summary of $CO_2$ Sorbent Development

| Sorbent | Sorbent A | Sorbent B | Sorbent C | Sorbent D | Sorbent E |
|---|---|---|---|---|---|
| Impregnating alkali metal | 12% $Na_2O$ | 15.85% $K_2O$ | 9.9% $K_2O$ + 6.5% $Na_2O$ | 5.4% $K_2O$ + 3.5% $Na_2O$ | 5.4% $K_2O$ + 3.5% $Na_2O$ |
| Support | $Al_2O_3$ | $Al_2O_3$ | $Al_2O_3$ | 10% $K_2O$/$Al_2O_3$ | 10% $K_2O$/$Al_2O_3$ |
| $CO_2$ wt % loading | 0.56 | 0.81 | 1.03 | 1.07 | 1.14 |
| Molar ratio of $H_2O$/$CO_2$ | 6.60 | 5.50 | 4.31 | 3.66 | 3.94 |
| Density (g/ml) | 0.60 | 0.48 | 0.53 | 0.62 | 0.7 |

Sorbent A was prepared by extrusion of $Na_2CO_3$ with Versal-700 $Al_2O_3$. $CO_2$ sorption loading was 0.56 wt %, with molar ratio of $H_2O$/$CO_2$ of 6.60.

Sorbent B was prepared by impregnation of $K_2CO_3$ solution onto alumina support. Higher $CO_2$ sorption capacity was due to higher dispersion of potassium carbonate on $Al_2O_3$. Formation of poison phase of potassium aluminate carbonate hydrate gradually reduced $CO_2$ capacity on stream.

Sorbent C was mixed Na+K sorbents, according to co-pending provisional application filed on the same date and titled MIXED METAL SORBENTS FOR $CO_2$/$H_2O$ DISPLACEMENT DESORPTION, herein incorporated by reference in its entirety as if fully set forth below. Addition of Na carbonate was to interrupt the crystallization of the poison phase K aluminate carbonate hydrate. The similar counterpart phase with Na cations does not exist. Better sorbent performance compared to 2nd generation sorbent, higher $CO_2$ sorption capacity of 1.03 wt % and lower $H_2O$/$CO_2$ ratio of 4.31.

Sorbent D was prepared by extrusions of $K_2CO_3$ with alumina to preform denser phase of pseudo $KAlO_2$, according to this disclosure. After extrusion, the 10% $K_2O$/$Al_2O_3$ was impregnated with $K_2CO_3$ and $Na_2CO_3$ solutions. Stable and high $CO_2$ loading of 1.07 wt % and much low $H_2O$/$CO_2$ ratio of 3.66 were observed. Also the density of the sorbent was increased to 0.62.

Sorbent E was prepared by extrusions of $K_2CO_3$ with alumina to preform denser phase support of $KAlO_2$, according to this disclosure. After extrusion, the support of 10% $K_2O$/$Al_2O_3$ was only dried at 250° F. in air before it use as support for Na and K carbonates deposition, according to co-pending provisional application filed on the same date and titled CALCINATION OF $CO_2$/$H_2O$ DISPLACEMENT DESORPTION SORBENTS, herein incorporated by reference in its entirety as if fully set forth below. Without calcination, more hydroxyl groups on the supports were preserved, which can act as anchoring points for Na and K carbonates dispersions. This leads to higher $CO_2$ loading of 1.14 wt %. Also the density of the sorbent was further increased to 0.70 g/ml, which indicates that $CO_2$ sorption loading per volume of sorbent increased.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the embodiments and claims presented in this application. It is important, therefore, that the claims be regarded as including such equivalent constructions.

What is claimed is:

1. A method for preparing a CCS sorbent, comprising:
    mixing an aluminum compound and an aqueous solution comprising a first alkali composition to form a dough comprising at least 3 wt % of the first alkali composition,
    extruding the dough to form an extrudate, and
    drying the extrudate to form a support comprising at least about 3 wt % of the first alkali composition;
    impregnating a second alkali composition into the support to create an impregnated support; and
    drying the impregnated support to create the CCS sorbent.

2. The method of claim 1, wherein the extrudate is further calcined after drying.

3. The method of claim 1, wherein the extrudate is dried at 125-500° C.

4. The method of claim 1, wherein the extrudate is dried at 250-350° C.

5. The method of claim 1, wherein the aluminum compound comprises aluminum oxide, aluminum oxide hydroxide, aluminum hydroxide, boehmite, or pseudoboehmite.

6. The method of claim 1, wherein the aluminum compound comprises aluminum oxide hydroxide, boehmite, or pseudoboehmite.

7. The method of claim 1, wherein the first alkali composition comprises potassium, sodium, or both potassium sodium.

8. The method of claim 1, wherein the support comprises a pseudo alkali aluminate.

9. The method of claim 1, wherein the support comprises a pseudo potassium aluminate.

10. The method of claim 1, wherein the second alkali composition comprises lithium, sodium, or potassium.

11. The method of claim 1, wherein the second alkali composition comprises sodium or potassium.

12. The method of claim 1, wherein the second alkali composition comprises sodium and potassium.

* * * * *